Jan. 5, 1954 R. C. McLAUGHLIN ET AL 2,664,877
OVEN CONSTRUCTION FOR RANGES
Filed June 22, 1950 4 Sheets-Sheet 1

Inventors
Robert C. McLaughlin
Harold H. Ring
By
McCanna and Morsbach
Attys.

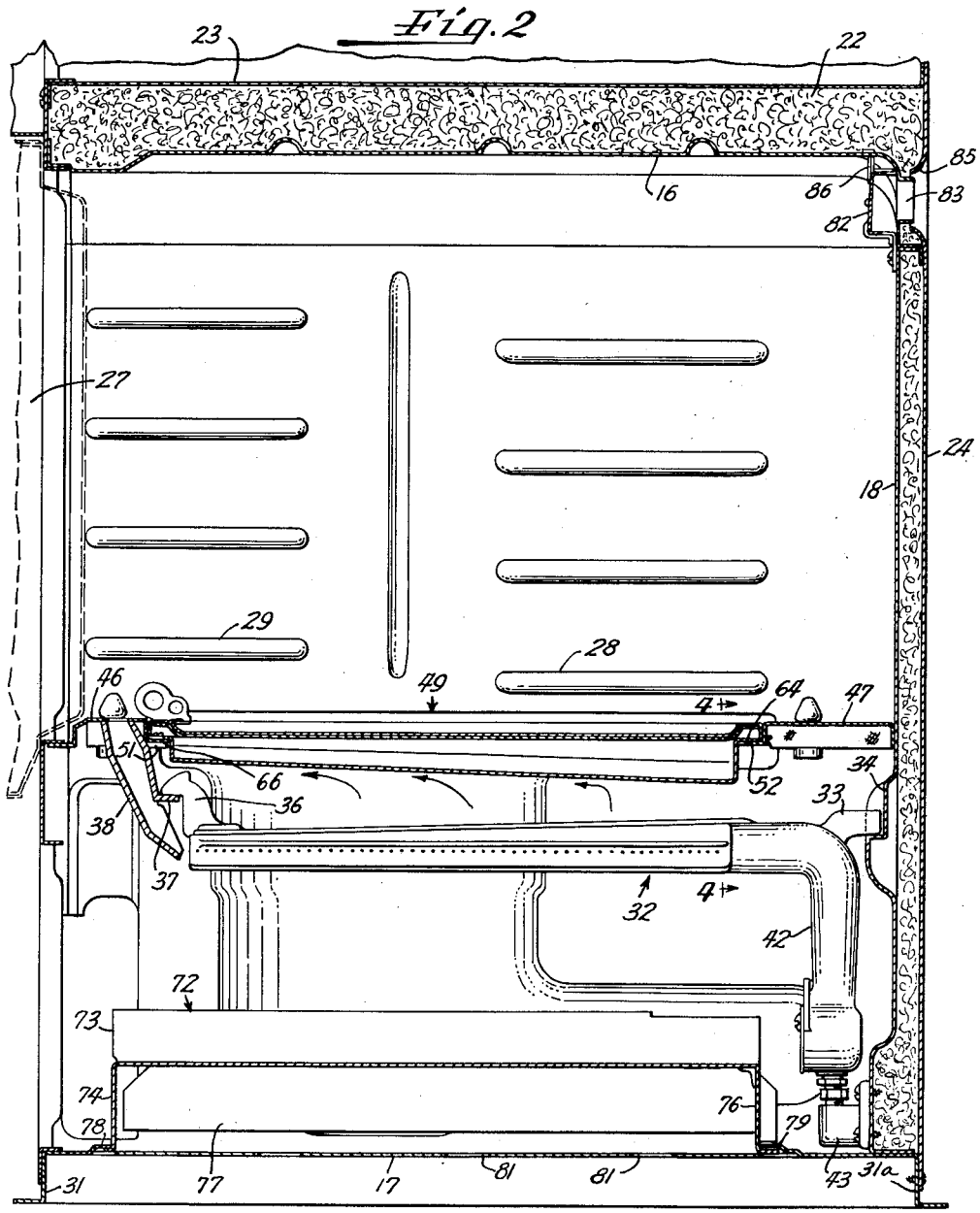

Jan. 5, 1954 R. C. McLAUGHLIN ET AL 2,664,877
OVEN CONSTRUCTION FOR RANGES
Filed June 22, 1950 4 Sheets-Sheet 3
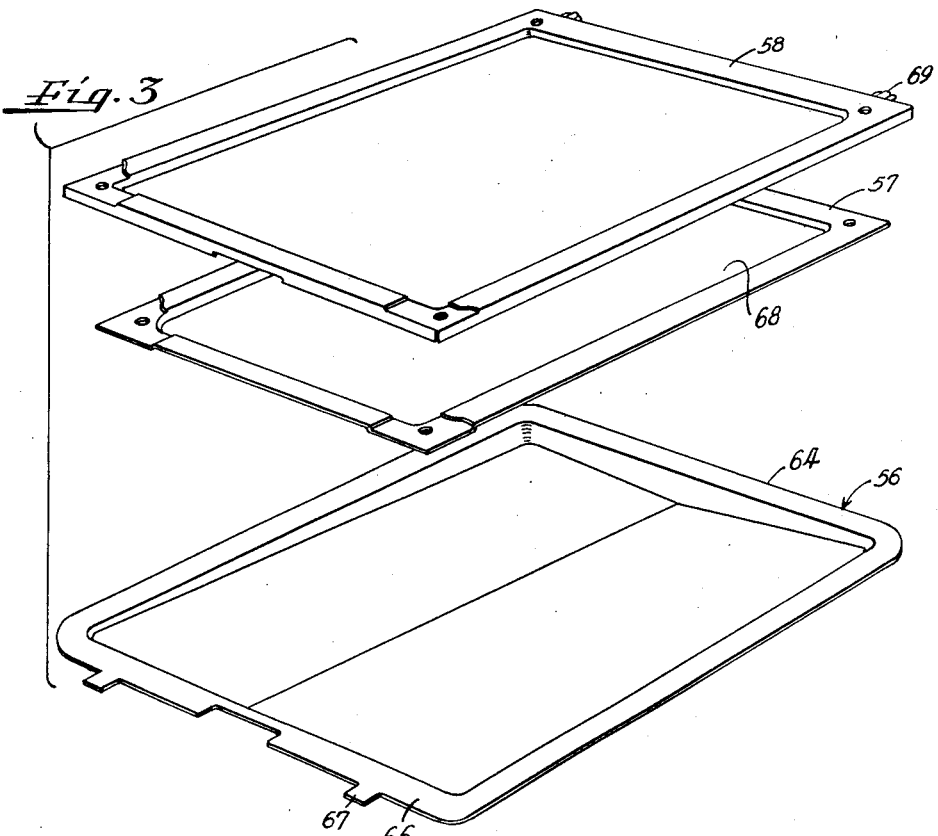
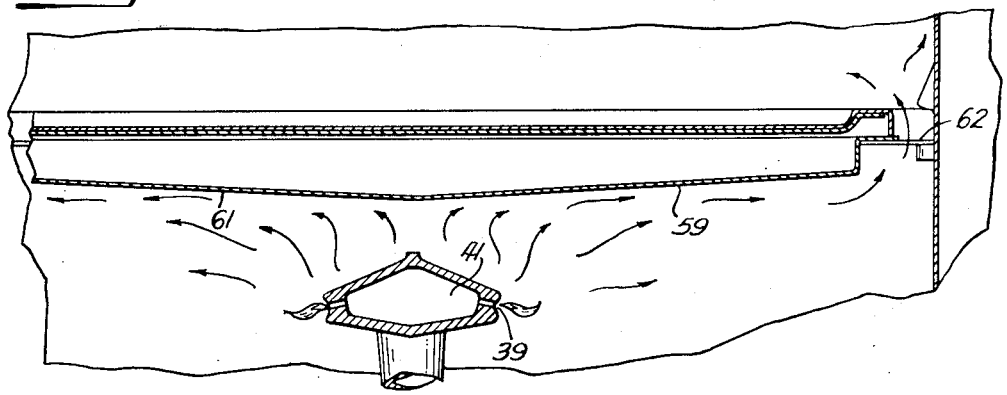
Inventors
Robert C. McLaughlin
Harold H. Ring
By
McCanna and Morsbach
Attys.

Jan. 5, 1954  R. C. McLAUGHLIN ET AL  2,664,877
OVEN CONSTRUCTION FOR RANGES
Filed June 22, 1950  4 Sheets-Sheet 4

Inventors
Robert C. McLaughlin
Harold H. Ring
By
McCanna and Morsbach
Attys.

Patented Jan. 5, 1954

2,664,877

UNITED STATES PATENT OFFICE 2,664,877

OVEN CONSTRUCTION FOR RANGES

Robert C. McLaughlin and Harold H. Ring, Rockford, Ill., assignors to Geo. D. Roper Corporation, Rockford, Ill., a corporation of Illinois Application June 22, 1950, Serial No. 169,598

8 Claims. (Cl. 126—39)

This invention relates to ovens and more particularly to ovens for gas ranges and stoves.

One of the difficulties encountered in designing ovens is to provide a construction that will satisfactorily pass laboratory and field test conditions of all users. Some users follow the American Gas Association standards of performance, which require that layers of cake baked on the first and fourth rack positions and checked by a reflectometer shall not be lighter than 58% nor darker than 25%, chalk being the standard of whiteness, nor shall the differential between layers of cake baked on the same rack exceed 18%, nor shall the differential between any layer of cake on either rack be greater than 26%; other users require that the layers of cake shall be cooked on other rack positions and meet other requirements. While some manufacturers have been able to design an oven that will satisfactorily pass some users' tests they have not always been entirely satisfactory in other respects.

An object of the invention is the provision of a novel baking oven construction that provides for uniform heat distribution throughout the oven.

Another object of the invention is the provision of a novel oven construction that is simple to construct, that is easy to clean, that has a high efficiency, that is rugged, and that is relatively inexpensive to produce.

Another object of the invention is the provision of an oven of the above character utilizing a bar burner for heating the oven.

Another object of the invention is the provision of novel means for controlling the flow of air to the burner and the flow of products of combustion from the oven.

Other objects and advantages of the invention will become apparent from the following detailed description taken in connection with the accompanying drawings, in which—

Fig. 2 is a sectional view taken substantially along the line 2—2 of Figure 1;

Fig. 3 is an exploded view showing the details of construction of the dividing wall forming the bottom oven;

Fig. 4 is a sectional view taken substantially along the line 4—4 of Fig. 2;

Figure 1:
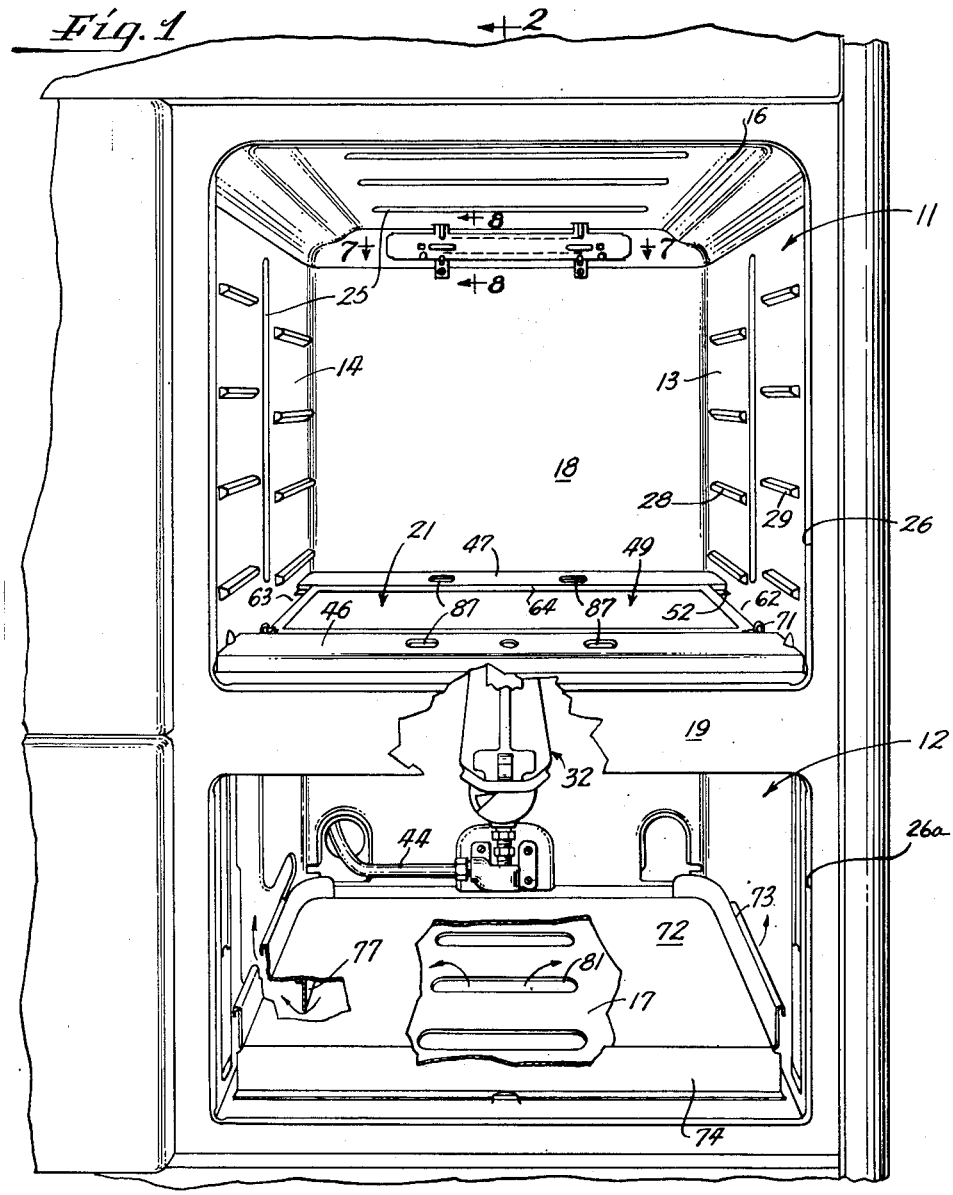
Figure 1 is a fragmentary perspective view of a gas range showing the oven construction embodying the present invention.

Referring now to the drawings the invention is shown embodied in an oven unit for a gas range or stove. For purposes of simplifying the drawings only fragmentary views of the range are shown. In general the oven unit includes a bake oven 11 and a broiler oven 12 as best seen in Figure 1. These ovens are defined respectively by the upper and lower portions of a compartment formed in the range and defined by spaced sides 13 and 14, a top 16, a bottom 17, a back 18 and a front 19. A dividing or separating wall 21 separates the compartment and forms an intermediate wall means defining a bottom for the bake oven 11 and top for the broiler oven 12. As best seen in Fig. 2 the oven unit is surrounded by a layer of suitable insulation 22 such as fiber glass disposed between the top 16 of the oven compartment and the burner box bottom 23, between the back of the oven 18 and the exterior panel 24 and in face to face contact with the sides 13 and 14. The oven 11 is accessible through an opening 26 closed by a door 27 hinged to the range in a conventional manner while the broiler oven 12 is accessible through an opening 26a closed by a door, not shown, hinged to the range in conventional manner. As shown the sides 13 and 14 and back 18 are formed as a single stamping and the front 19 is welded in position at the forward ends of the sides. The sides and top may be crimped as shown at 25 for strengthening purposes. Preferably the sides 13 and 14 are formed with horizontally disposed inwardly extending elongated projections or rack supports 28 and 29, the projections 28 being adjacent the back 18 and the projections 29 being adjacent the front 19 and spaced at an elevation slightly above the projections 28 as shown in Fig. 2. While the projections 28 and 29 are primarily for the purpose of supporting a rack such as disclosed in the application of Harold H. Ring, Serial No. 146,418, filed February 27, 1950, now Patent No. 2,633,400, they also serve as strengthening members. The top 16 is shaped to rest on the upper edges of the sides 13 and 14 and the back 18 and is secured in position and to the front as by welding along the abutting edges of the respective members. The bottom 17 is formed with depending sides or feet 31 and 31a that space the bottom 17 up from the extreme lower edges of the feet portion and provide a support engageable with the floor or the like and upon which the back 18, sides 13 and 14 and front 19 may rest. Any suitable means may be used for rigidly interconnecting these parts in rigidly assembled relation.

A burner 32 for heating the oven unit is disposed in the broiler oven 12 to be immediately below the compartment separating wall 21. In this embodiment of the invention the burner 32 is of an elongated bar type extending from the front to the back of the compartment and having its longitudinal axis midway between the sides 13 and 14. As shown in Fig. 2 the back end of the burner 32 is provided with a lug 33 shaped to be received in an upwardly facing recess 34 formed in the back 18 and the front end of the burner is provided with a support lug 36 shaped to rest on a shoulder 37 formed by a tab struck out of a flash tube 38 supported on the forward end of the compartment dividing wall 21. The burner is formed with a plurality of aligned ports 39 on each side of the burner in communication with a central gasway 41 in the burner extending lengthwise thereof. Gas is supplied to the burner through a mixing tube connection 42 connected to a fitting 43 secured to the back 18 adjacent the bottom 17 and connected to a gas line 44 leading to a gas supply line, not shown.

The dividing wall 21 in this embodiment of the invention is formed by a front crosspiece 46 and a back crosspiece 47, both of which are rigidly supported by the spaced sides 13 and 14, and a removable portion 49 resting on a ledge 51 at the rear edge of the front crosspiece 46 and a ledge 52 on the forward edge of the rear crosspiece 47. As best seen in Fig. 3 the removable portion 49 is formed by three separable pan-shaped pieces 56, 57 and 58 shaped to nest together as best seen in Fig. 4. The lower pan-shaped member 56 overlies the burner 32 and forms a top of the broiler oven 12. As shown, the member 56 is formed with a depressed central portion, the bottom of which is defined by two inclined portions 59 and 61. These latter portions incline downwardly from the side edges toward the middle of the member 56 and downwardly from the front of the pan to the back of the pan as seen in Fig. 2. With this construction the bottom of the pan has a general V-shaped cross section as seen in Fig. 4 with the bottom of the V overlying the longitudinal axis of the burner. The side edges of the pan-shaped member 56 are preferably spaced inwardly from the sides 13 and 14 as shown in Figure 1 to define passageways 62 and 63 between the oven 11 and the compartment 12 for the products of combustion and convection heat currents. The front and back edges of the member 56 are shaped to define flanges 64 and 66 adapted to rest on the ledges 52 and 51 respectively on the crosspieces. The front edge 66 is also formed with spaced forwardly extending tabs 67 shaped to be received in openings in the front crosspiece 46 and facing the back crosspiece 47.

The intermediate pan-shaped member 57 is formed with a depressed central portion 68 and a peripheral edge shaped to rest on the peripheral edge of the lower pan-shaped member 56. Preferably the pan-shaped member 57 is formed of material having good reflection characteristics, such as aluminized steel or the like. The top pan-shaped member 58 rests on the intermediate pan-shaped member 57 and is formed with a depending peripheral flange engageable with the peripheral flange of the lower pan-shaped member 56 as shown in Fig. 4. The top pan-shaped member 58 is formed with rearwardly extending tabs 69 shaped to be received in spaced recesses in the back crosspiece 47 and facing the front crosspiece 46. Manually operable locking cams 71 pivotally mounted on the front crosspiece 46 are shaped to engage the forward peripheral edge of the top member 58 to secure it and the other pan-shaped members 56 and 57 in a rigid assembled relation.

In assembling the pan-shaped members the bottom member 56 is inclined so that the tabs 67 can be inserted in the respective recesses in the front crosspiece. The lower member 56 is then lowered into position so that its rear edge rests on the ledge 52 of the back crosspiece 47. The pan-shaped member 57 is then inserted in the oven 11 and positioned in nested relation with the pan-shaped member 56. The upper member 58 is then inserted in the oven and inclined so that the tabs 69 can be inserted in the recesses in the back crosspiece 47. The upper member 58 is then lowered into position and the locking cams 71 are swung into position to engage the forward edge of the upper member 58 to lock it and the other members in tightly assembled relation with the crosspieces 46 and 47.

A toaster rack 72 is mounted in the broiler oven 12 beneath the burner 32. In this instance the rack includes upstanding side edges 73, a depending front support 74, a depending back support 76 and depending ribs 77 spaced inwardly from the sides of the rack 72. As best seen in Fig. 2 the depending front support 74 and the depending back support 76 rest on the bottom 17 and extreme lower edge of the front 74 is shaped to be disposed beneath a tongue 78, struck out of the bottom 17, and the back 76 is shaped to be disposed beneath a tongue 79 struck out of the bottom 17 adjacent the oven back. The lower edges of the ribs 77 are spaced upwardly from the bottom 17 as best seen in Fig. 2. Transversely extending elongated slots 81 are formed in the bottom 17 between the ribs 77 to provide air entrance passageways into the burner compartment capable of supplying the air necessary for the combustion of the gases issuing from the ports of the burner 32.

Figure 8:
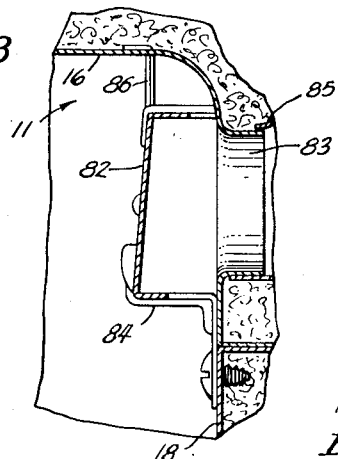
Fig. 8 is a sectional view taken substantially along the line 8—8 of Figure 1.

A baffle 82 (see Figs. 7 and 8) is provided for controlling the flow of the products of combustion and heat from the oven 11 to the flue 85 at the back of the range. For this purpose the baffle 82 is mounted in the oven 11 to extend across an elongated aperture 83 formed adjacent the top 16 of the oven and providing communication between the oven and the flue 85. As best seen in Figs. 1 and 2, 7 and 8 the baffle, which is a rectangular member, is both longer and wider than the aperture 83 so that the baffle overlaps the sides and ends of the hole as seen in Figure 1. The baffle 82 is supported by spaced brackets 84 secured to the back 18 and shaped to engage the lower edge of the baffle 82. Tabs 86 extending upwardly from the upper edge of the baffle 82 as shown in Fig. 8 extend through apertures in the top 16 and are folded over the latter as shown to aid in supporting the baffle in the position shown in the drawings. With this construction there is in effect a narrow annular flow or restricted flow of gases from the oven to the flue 85.

To better understand the oven construction a description of its operation follows: It is assumed that the burner 32 is lighted. Concurrently with the ignition of the burner air flows through the passageways 81 in the bottom 17 up about the edges of the toaster rack and into the broiler compartment 12 on both sides of the burner 32 to supply air to the burner. The construction is such that the flow paths about the toaster rack are symmetrical and as a consequence both sides of the oven are heated uniformly. Also it will be noted that the ribs 77 on the toaster in effect define a throttle which controls or restricts the flow of air into the compartment so that the burner operation is substantially uniform even though the air on the exterior of the range may be gusty or drafty. The products of combustion are directed generally forwardly and to the sides of the lower pan-shaped member 56 due to the inclination of the bottom portions 59 and 61 as shown by the arrows in Figs. 2 and 4. The deflection of the products of combustion toward the door of the oven is advantageous because in conventional constructions there is a tendency for seepage of heat or loss of heat to occur about the periphery of the oven door. The forward deflection of the heat thus serves to maintain a uniform temperature throughout the oven while at the same time supplying heat losses adjacent the doors inherent in an oven construction. The products of combustion flow up through the passageways 62 and 63 along the sides of the oven and the lower projections 28 adjacent the back 18 of the oven tend to squeeze or force the products of combustion toward the front of the oven which is desirable as pointed out. Some transfer of heat between the broiler oven 12 and the bake oven 11 occurs through apertures 87 in the front and back crosspieces 46 and 47 and symmetrically located on opposite sides of the centerline of the oven compartment, as best seen in Fig. 1. The products of combustion are discharged through the narrow annular passageway between the baffle 82 and the back of the oven and through the passageway 83 to the flue 85. The baffle serves to restrict the flow of the products of combustion from the oven and thereby assures that the heat is in effect backed up in the oven so that all parts can be uniformly heated. It will be observed that the flow path of the products of combustion through the oven is symmetrical on both sides of the centerline of the oven. As a consequence of this uniform flow pattern and the fact that the discharge is in effect throttled, test experience shows that cakes baked on any rack position in this oven meet the strictest of test requirements. Another factor contributing to the uniform heat distribution in the oven is that the air utilized by the burner is caused to flow to the burner in a symmetrical pattern so that both sides of the bottom pan-shaped member 56 are heated uniformly. Also the heat passing through the pan-shaped member 56 is reflected back to the pan-shaped member 56 by the pan-shaped member 57 which is formed of material having good heat reflection characteristics.

Figure 5:
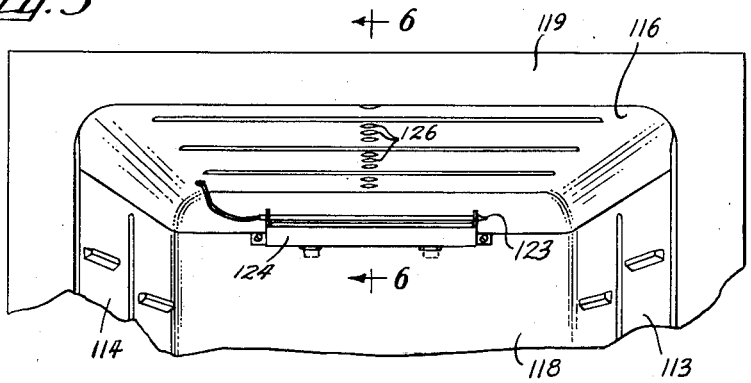
Fig. 5 is a modified form of the invention shown in Figure 1.
Figure 6:
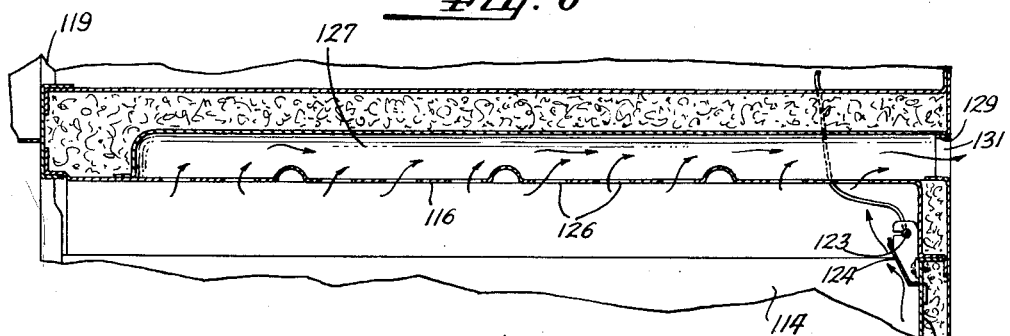
Fig. 6 is a sectional view taken substantially along the line 6—6 of Figure 5.
Figure 7:
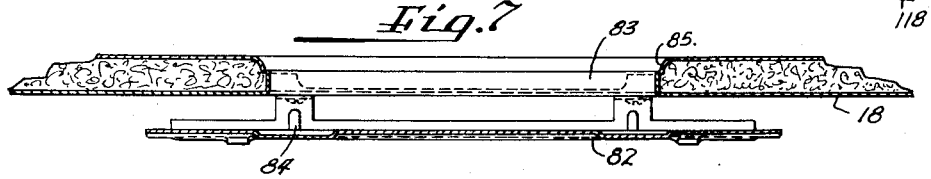
Fig. 7 is a sectional view taken substantially along the line 7—7 of Figure 1.

In Figures 5 and 6 there is shown a modification of the invention. In this embodiment of the invention the oven unit has the same general construction as described hereinbefore including spaced sides 113 and 114, a top 116, a bottom, not shown, a back 118, a front 119, and rack supports 121 and 122 projecting inwardly from the sides. An oven thermostat bulb 123 adjacent the top of the oven is supported by a bracket 124 attached to the back 118. This embodiment of the invention differs however from the embodiment shown in Figs. 1-4, 7 and 8 in the structure for exhausting the products of combustion from the bake oven. As best seen in Fig. 6 the products of combustion in this embodiment are discharged through a plurality of aligned apertures 126 of relatively small diameter formed in the top and symmetrically located with respect to the centerline of top 116. The apertures 126 are in communication with a passageway 127 adjacent the top and extending from the front to the back of the oven and leading to a flue at the back not shown. The passageway in this instance is defined by a jacket having a generally U-shaped cross section and secured to the top as by having its edge portions welded to the top. The rear end of the jacket rests on a flange 129 defining an aperture 131 leading to the flue. The operation of this unit is substantially the same as that described hereinbefore except that in this instance the products of combustion are discharged through the apertures 126 at the top of the oven. It is to be understood that the number and size of the openings is such that the flow is restricted so that the heat is in effect backed up in the oven and so that the oven is uniformly heated.

We claim:

1. The combination in a gas range of a compartment formed by spaced sides, a front, a back, a top, and a bottom, said front having spaced openings, intermediate wall means between said openings in substantially parallel relation with said top and bottom of said compartment to divide the compartment into a bake oven and a broiler oven, doors for said openings, said intermediate wall means having apertures adjacent the front and back effecting communication between the ovens and having its side edges spaced from the sides of said compartment to define elongated passageways adjacent the sides effecting communication between the ovens, said intermediate wall means having its surface adjacent the broiler oven presenting an imperforate wall portion sloping downwardly from the side edges toward the center of the intermediate wall means and downwardly from the front to a location adjacent the back of the compartment, a burner for heating the compartment positioned with all of its flame ports disposed immediately below said intermediate wall means, said burner extending along the centerline of said compartment to have the products of combustion and heat from its flame ports deflected by said imperforate wall portion of the intermediate wall means generally outwardly from the center to the sides and forwardly from the back to the front of the compartment to effect a uniform heat distribution throughout the bake oven, and flow control means adjacent the top of the compartment for exhausting the products of combustion from the compartment.

2. The combination recited in claim 1 with elongated rack supports on said sides adjacent the front and back of the bake oven, said supports projecting inwardly of the bake oven and overlying the passages defined by the intermediate wall means and the sides, said rack supports adjacent the back of the bake oven being at a lower elevation than said rack supports adjacent the front to direct some of the products of combustion flowing through said passageways generally toward the front of the bake oven.

3. The combination recited in claim 1 wherein the last mentioned means includes aligned apertures formed in said top extending along the front-to-back centerline of the latter, and a jacket mounted on said top defining a passageway adjacent the top extending from the front portion to the back portion of the bake oven and leading to a flue.

4. The combination in a gas range of a compartment formed by spaced sides, a front having spaced openings, a back, a top, and a bottom having elongated slots at the center of said compartment symmetrical with the centerline thereof, intermediate wall means between said openings in said front in substantially parallel relation with said top and bottom of said compartment to divide the compartment into a bake oven and a broiler oven, doors for said openings in the front, said intermediate wall means having its side edges spaced from the sides of said compartment to define elongated passageways adjacent the sides of said intermediate wall means effecting communication between the bake oven and said broiler oven, said intermediate wall means at its surface adjacent the broiler oven presenting an imperforate wall portion sloping downwardly from the side edges toward a centerline of the compartment and downwardly from the front to a location at substantially the back of the compartment, an elongated bar burner disposed in said broiler oven to position all of its flame ports immediately below said imperforate wall portion of the intermediate wall means and having its longitudinal axis in alignment with a centerline of said compartment whereby the products of combustion and heat from its flame ports are deflected by said imperforate wall portion of the intermediate wall means generally outwardly from the center to the sides and forwardly from the back to the front of the compartment, a toaster rack mounted in said broiler oven beneath said burner and having a portion overlying said slots in the bottom and having depending side ribs spaced from the bottom and defining therewith restricted passageways on opposite sides of the elongated slots in the bottom of the compartment for the air flowing to the burner, and flow control means adjacent the top of the compartment for exhausting the products of combustion from the compartment and to effect a uniform heat distribution throughout the bake oven.

5. The combination in a gas range of a compartment formed by spaced sides, a front, a back, a top and a bottom, said back having an elongated slot symmetrically arranged with the centerline of said back, intermediate wall means dividing said compartment into a bake oven and a broiler oven beneath the bake oven, said intermediate wall means having its side edges spaced from the sides of said compartment to define elongated passageways adjacent the sides effecting communication between the bake oven and said broiler oven, said intermediate wall means at its surface adjacent the broiler oven presenting an imperforate wall portion sloping downwardly from the front to a location adjacent the back of the compartment, doors for said ovens mounted on said front, a burner disposed in said broiler oven with all of its flame ports positioned immediately below said imperforate wall portion of the intermediate wall means and extending along the centerline thereof, a baffle in spaced relation to the back and overlapping the sides and ends of said elongated slot in said back, and means for mounting said baffle to define a restricted passageway symmetrical with the centerline of the back for discharging the products of combustion from the compartment.

6. The combination in a gas range of a compartment formed by spaced sides, a front, a back, a top and a bottom, said back being deformed to define an upwardly facing recess intermediate said sides, intermediate wall means between said top and bottom and above said recess separating said compartment into a bake oven and a broiling oven beneath the bake oven, said intermediate wall means comprising a back crosspiece adjacent the back of the compartment rigidly supported by the spaced sides, a front crosspiece adjacent the front of the compartment rigidly supported by the spaced sides and a removable central portion supported by said front and back crosspieces and spaced from the sides to define elongated passageways effecting communication between the bake and broiler ovens, said central portion at its bottom surface presenting an imperforate wall portion which slopes generally downwardly from said front crosspiece to said back crosspiece, a flash tube intermediate said sides and supported by said front crosspiece extending into said broiler compartment, said flash tube having an upwardly facing shoulder formed thereon, a burner, a lug at one end of said burner receivable in said recess on the back and a lug at the opposite end of the burner shaped to rest on said shoulder on the flash tube to support said burner with all of its flame ports positioned beneath said imperforate wall portion of the intermediate wall means to have the burner extend along the centerline of the compartment whereby the products of combustion from the flame ports of the burner are directed to flow generally toward the front of the compartment and to the passageways at the sides to distribute heat uniformly throughout the bake oven.

7. The combination in a gas range of a compartment formed by spaced sides, a front having spaced openings, a back, a top, and a bottom, intermediate wall means between said openings in substantially parallel relation with said top and bottom of said compartment to divide the compartment into a bake oven and a broiler oven, doors for said openings, said intermediate wall means comprising a front crosspiece adjacent the front of the compartment and supported by said spaced sides, a back crosspiece adjacent the back of the compartment and supported by said spaced sides, a central portion supported by said front and back crosspieces and having its edges spaced from the sides to define elongated passageways effecting communication between the bake oven and said broiler oven, said crosspieces having apertures effecting communication between the bake oven and the broiler oven symmetrically located with respect to the centerline of said compartment, said central portion at its surface adjacent the broiler oven presenting an imperforate wall portion sloping generally downwardly from the front crosspiece to the back crosspiece, releasable means for locking said central portion in fixed relation with said crosspieces, an elongated bar burner disposed in said broiler oven with all of its flame ports located immediately below said imperforate wall portion of the intermediate wall means and having its longitudinal axis in alignment with the centerline of said compartment whereby the products of combustion and heat from the flame ports of the burner flow generally outwardly from the center to the sides through said passageways and forwardly from the back to the front of the compartment to effect a uniform heat distribution throughout the bake oven, and flow control means adjacent the top of the compartment for restricting the flow of the products of combustion from the compartment.

8. The combination recited in claim 7 in which said central portion comprises upper, lower, and intermediate pan-shaped members shaped to nest together, said lower pan-shaped member having a dished portion the bottom of which is formed by portions inclining from the front to the back and from the sides toward a centerline of the lower member, said intermediate member having a dished portion the bottom of which is shaped to be spaced above the bottom of the lower member to define an air space therebetween, said upper member having a dished central portion the bottom of which is in face to face contact with the bottom of the intermediate member.

ROBERT C. McLAUGHLIN.
HAROLD H. RING.

References Cited in the file of this patent

UNITED STATES PATENTS

| Number | Name | Date |
|---|---|---|
| 1,079,356 | Maul | Nov. 25, 1913 |
| 1,409,923 | Busiek | Mar. 21, 1922 |
| 1,520,464 | Busiek | Dec. 23, 1924 |
| 2,160,764 | Taylor | May 30, 1939 |
| 2,207,358 | Rogers | July 9, 1940 |
| 2,259,639 | Hennessy | Oct. 21, 1941 |
| 2,369,825 | Hennessy | Feb. 20, 1945 |